United States Patent [19]

Wood et al.

[11] Patent Number: 4,881,951

[45] Date of Patent: Nov. 21, 1989

[54] ABRASIVE GRITS FORMED OF CERAMIC CONTAINING OXIDES OF ALUMINUM AND RARE EARTH METAL, METHOD OF MAKING AND PRODUCTS MADE THEREWITH

[75] Inventors: William P. Wood, Larry D. Monroe; Stanley L. Conwell, all of St. Paul, Minn.

[73] Assignee: Minnesota Mining and Manufacturing Co., St. Paul, Minn.

[21] Appl. No.: 188,744

[22] Filed: May 2, 1988

Related U.S. Application Data

[63] Continuation-in-part of Ser. No. 54,619, May 27, 1987, abandoned.

[51] Int. Cl.$^4$ .............................................. B24D 3/02
[52] U.S. Cl. .................................... 51/309; 51/293; 51/295
[58] Field of Search ......................... 51/293, 295, 309

[56] References Cited

U.S. PATENT DOCUMENTS

| | | | |
|---|---|---|---|
| 4,142,871 | 3/1979 | Zeiringer | 51/308 |
| 4,217,113 | 8/1980 | Suh et al. | 51/309 |
| 4,252,544 | 2/1981 | Takahashi | 51/309 |
| 4,331,627 | 5/1982 | Yamamoto et al. | 51/309 |
| 4,333,859 | 6/1982 | Vaughan et al. | 423/329 |
| 4,467,767 | 7/1984 | Poon et al. | 51/298 |
| 4,518,397 | 5/1985 | Leitheiser et al. | 51/293 |
| 4,543,107 | 9/1985 | Rue | 51/309 |
| 4,574,003 | 3/1986 | Gerk | 51/309 |

FOREIGN PATENT DOCUMENTS 49-2590  1/1974  Japan .

Primary Examiner—Paul Lieberman
Assistant Examiner—Willie J. Thompson
Attorney, Agent, or Firm—Donald M. Sell; Walter N. Kirn; Richard Francis

[57] ABSTRACT

Ceramic abrasive grits comprising alpha alumina and at least about 0.5 percent by weight rare earth metal oxide are prepared by combining alumina hydrate and rare earth metal oxide or its precursors to produce a blend, drying the blend to produce a dried solid, crushing the dried solid to produce grits, calcining the dried grits to substantially remove bound volatile materials, and firing the grits to produce a ceramic material. The rare earth metal is selected from the group consisting of praseodymium, samarium, ytterbium, neodymium, lanthanum, gadolinium, cerium, dysprosium, erbium, and mixtures of one or more rare earth metal.

46 Claims, No Drawings

ABRASIVE GRITS FORMED OF CERAMIC CONTAINING OXIDES OF ALUMINUM AND RARE EARTH METAL, METHOD OF MAKING AND PRODUCTS MADE THEREWITH

This is a continuation-in-part of application Ser. No. 54,619 filed May 27, 1987, abandoned.

1. Technical Field

This invention relates to the production of alumina-based ceramic abrasive grits, a method of making the same, abrasive products made with the abrasive grits and a method of using the abrasive products.

2. Background Art

The preparation by a sol-gel process of dense, alumina-based ceramic abrasive grain is described, for example, in Leitheiser et al, U.S. Pat. No. 4,314,827, assigned to the assignee of the present application. This patent teaches making abrasive grains by employing chemical ceramic technology by gelling an alumina monohydrate sol with a precursor of at least one modifying component followed by dehydration and firing. The modifying component is selected from zirconia, hafnia, a combination of zirconia and hafnia, and a spinel derived from alumina and at least one oxide of cobalt, nickel, zinc, or magnesium.

Other references which disclose the preparation of alumina-based ceramic abrasive grains include the following:

(1) Monroe et al, U.S. Pat. No. 4,770,671 entitled Abrasive Grits Formed of Ceramic Containing Oxides of Aluminum and Yttrium, Method of Making and Using the Same and Products Made Therewith.

(2) Schwabel, U.S. Pat. No. 4,744,802 entitled Process For Durable Sol-Gel Produced Alumina-Based Ceramics, Abrasive Grain and Abrasive Products.

(3) Cottringer et al, U.S. Pat. No. 4,623,364, issued Nov. 18, 1986, entitled Abrasive Material and Method For Preparing The Same.

(4) Gerk, U.S. Pat. No. 4,574,003, issued Mar. 4, 1986, entitled Process For Improved Densification of Sol-Gel Produced Alumina-Based Ceramics.

(5) Gerk et al, U.S. Serial No. 830,478, filed Feb. 13, 1986, entitled Superior High Sodium and Calcium Abrasive and Process For Its Production.

Minnesota Mining and Manufacturing (3M) Company, the assignee of the present application, markets sol-gel alumina based ceramic abrasive grits under the trade designation "Cubitron". Abrasive products containing "Cubitron" abrasive grits have been found to perform in a superior manner as compared to the best fused synthetic abrasive mineral in many applications. A typical example of a high performance fused synthetic abrasive mineral is fused alumina-zirconia available, for example, under the trade designation "Nor-Zon" from the Norton Company.

RARE EARTH METAL OXIDE REFERENCES

Kiger et al, U.S. Pat. No. 3,802,893, disclose an abrasion-resistant polycrystalline ceramic consisting essentially of about 99.5% to 99.9% $Al_2O_3$, about 0.01% to 0.25% MgO and about 0.01% to 0.25% samarium oxide, having a grain size of from about 2 to 5 microns and a density of at least 3.90 gms/cc. The ceramic is made by wet milling the oxide powders with an organic binder, drying and screening the mixture to form a free-flowing powder, cold pressing the dried powder to form a shaped article, presintering to remove the organics and firing the shaped article at a temperature above about 1500° C. for about 5 hours in a hydrogen atmosphere to provide a ceramic which is said to have utility as a cutting tool. Only very small levels of MgO and $Sm_2O_3$ additions are said to be helpful. Larger amount of MgO and $Sm_2O_3$ are said to adversely effect the hardness and abrasion resistance of the ceramic. $Sm_2O_3$ is called an essential additive, while other rare earth oxides such as $Gd_2O_3$, $Eu_2O_3$, $Yb_2O_3$, and $Y_2O_3$ are stated to produce a ceramic which does not have the same fine grain structure and uniformity obtained with the $Sm_2O_3$ addition.

U.S. Pat. No. 4,181,532 discloses the preparation of a porous ceramic material suitable for use as a catalyst carrier and therefore not useful as an abrasive because of the porosity. The ceramic is prepared from a collodial dispersion of alumina and a compound of yttrium or a lanthanide.

U.K. Pat. GB No. 2,094,288B, published Sept. 15, 1982, discloses a ceramic material which is said to have utility as a cutting tool and is composed of up to 20% yttrium or rare earth oxide, up to 20% chromium oxide, up to 2% MgO and the balance of 100% $Al_2O_3$. The grain size is reported to be 1.5 to 2 micro meters. A rare earth element oxide or yttrium oxide content below 0.05% and above 17.0% are suggested to be avoided to prevent reduced mechanical strength and thus cutting durability. The process for making the ceramic bodies appears to be by powder consolidation and sintering. Chromium oxide content below 0.025% and above 15.0% are said to lower hardness and thus cutting durability. By contrast, abrasive grains made by a sol gel process with added chromium oxide have not been found to have improved cutting durability with chromium oxide additions in such amounts.

Japanese patent publication No. 58/161969, published Sept. 26, 1983, discloses a ceramic composition formed of 100 parts of a mixture of 55 to 90% $Al_2O_3$ and 10 to 45% TiC (containing 5-15% $TiO_2$) with 0.005 to 2% $Dy_2O_3$. Powdered starting material is molded, sintered in an inert gas, and then isostatically hot pressed to make a ceramic having a relative density greater than 99.5%. The ceramic is said to have utility as a cutting tool.

Japanese patent publication No. JP 59/102865 published June 14, 1984, discloses a ceramic composition formed by adding 0.05 to 3 parts $Tb_4O_7$, $Ho_2O_3$, $Er_2O_3$ and/or $Gd_2O_3$ to 100 parts of a mixture of 55-90 weight percent $Al_2O_3$ and 10-45 weight percent TiC (containing 3-25% Ti), optionally including 0.05 to 3 parts MgO, $Y_2O_3$, $ZrO_3$ and NiO and/or $Dy_2O_3$. Ceramic cutting tools are formed by wet mixing and pressing powdered starting materials, presintering the pressed compact in argon at 1670° C., and then hot pressing the presintered compact at 1400° C. and 1500 kg/cm² for 1 hour.

A technical article entitled "Effects of Rare Earth Oxides on Sintering of Alumina" by Hamano, Ohta and Ozaki in the Japanese publication *Yogyo Kyokaishi*, 87 (12), pp 632-41, published Dec., 1979, discloses a study involving sintering $Al_2O_3$ with and without 2 weight percent $Y_2O_3$, $La_2O_3$, $Sm_2O_3$, and $Er_2O_3$. At 1500° C. $Sm_2O_3$ and $Er_2O_3$ were found to enhance the sintering rate while $Y_2O_3$ and $La_2O_3$ suppress sintering. All of the rare earth metal oxides studied promoted densification above 1700° C. Microstructures of the fired bodies were significantly affected by the rare earth metal oxide additions. $Sm_2O_3$ additions resulted in exaggerated grain growth of the alumina while $Er_2O_3$ additions were found to suppress exaggerated grain growth.

An article of Ohta, Hamona and Nakagawa entitled, "Effects of Erbium (III) Oxide Addition on Sintering of Alumina," *Yogyo Kyokaishi*, 88(9), 531-8, published Sept., 1980, describes that $Er_2O_3$ inhibits densification of alumina at 1400° C. and below, but accelerates densification markedly at higher than 1500° C. The optimum level of doping was found to be 0.5 weight percent $Er_2O_3$.

An article entitled "Effects of Erbium (III) Oxide Addition on Final State Sintering of Alumina", also by Hamona, Ohta and Nakagawa, *Yogyo Kyokaishi*, 88(11), 666-73, published November, 1980, reports densification of erbium aluminates, formed by the solid state reaction, was accelerated in specimens fired at higher than 1650° C. The addition of $Er_2O_3$ promoted the growth of corundum grains slightly and narrowed the distribution of grain size.

While certain of the aforementioned references indicate that improved physical properties may be obtained in ceramic cutting tools by inclusion in such ceramics of certain rare earth metals or their oxides, such disclosure does not direct the person skilled in the abrasive art to make similar additions to ceramic abrasive grains.

Cutting tools cannot be equated with abrasive grain for several reasons. Grinding was once considered to be a purely mechanical action of metal removal much as a cutting tool. This was supported by the fact that the two commonly used abrasives, aluminum oxide and silicon carbide, behaved differently on different materials. Alumina, believed to be the tougher mineral, was effective on high tensile steels while SiC was more effective on low tensile materials. With further study of these materials, it was determined that SiC was actually the tougher of the two minerals. With the development of $B_4C$, which was a much harder and tougher grain than either alumina or SiC, it was found that this new mineral was inferior to both alumina and SiC in grinding steels. The theory that grinding was totally a mechanical process fell apart.

The reason why grinding is not totally a mechanical process may be found in comparing the distribution of energy used in metal removal by cutting tools and abrasive grinding. In cutting tools it has been estimated that up to 90% of the total energy used for cutting is removed with the chips and that only about 5% of this total energy goes into the metal surface as heat. As a result, the cutting tool temperature remains relatively low, about 700° to 800° C. for normal cutting speeds. For abrasive grinding, the total energy input into the operation is up to ten times greater than with cutting tools. And of the total energy input, about 80% goes into the workpiece at the grinding interface as heat compared with 5% for cutting tools. The energy going into the workpiece as heat is thus 160 times greater in the case of abrasive grinding than cutting tools. The reason for this difference may be found in the different mechanisms of chip formation and the values of rake angle. In cutting tools the rake angle is near zero allowing almost complete freedom for upward flow and removal of the chip. In abrasive grinding, rake angles have large negative values and there is considerable resistance to upward flow. As a result, considerable energy is spent in deforming the surface in grinding while little energy is removed with the chips. The temperature of the grinding interface thus reaches very high values, and may even reach the melting point of the metal as evidenced by solidified chips often found in the grinding swarf. Another indication of the high temperatures present is the spark shower observed in grinding which consists of chips heated to red or white heat.

As a result of the high temperatures encountered at the grinding interface, the interaction between the metal, the abrasive grain and the atmosphere must be considered. For example, the best explanation of why aluminum oxide is a better abrasive on most steels than silicon carbide is that a chemical reaction occurs at the high temperatures encountered in abrasive grinding between the silicon carbide and the steel which in effect "melts" the abrasive and causes excessive wear. Tungsten carbide, boron carbide and titanium boride are also examples of very hard materials which have been found to be excellent cutting tool materials, yet have little utility as an abrasive grain due to their reactivities with various metals.

It is therefore incorrect to assume that abrasive grains are the same as cutting tools and that a composition which works well as a cutting tool will also work well as an abrasive grain.

The inclusion of rare earth metal oxide of the type hereinafter defined in abrasive grits relative to the present invention is unknown and would not be apparent to one skilled in the abrasive art.

SUMMARY OF THE INVENTION

The present invention provides ceramic abrasive grits formed by a sol-gel process or an impregnation process which have superior abrasive performance in abrading certain workpieces such as those made of stainless steel, titanium, high nickel alloys, aluminum and others, and excellent performance on more conventional workpieces such as mild steel.

The ceramic abrasive grits comprise alpha alumina and thus are alumina-based. The alumina-based ceramic abrasive grits of the invention have a ceramic composition selected from the group consisting of (a) a first composition consisting of (1) up to 30% by weight yttria, (2) a reaction product of aluminum oxide at least about 0.5% by weight of the oxide of a rare earth metal selected from the group consisting of praseodymium, samarium, ytterbium, neodymium, lanthanum, gadolinium, cerium, dysprosium, erbium, and mixtures of two or more of such rare earth metals, and (3) alpha alumina making up the balance of 100% by weight; and (b) a second composition comprising (1) up to about 30% by weight of yttria, (2) a reaction product of aluminum oxide and at least about 0.5% by weight of the oxide of a rare earth metal selected from the group consisting of praseodymium, ytterbium, neodymium, lanthanum, gadolinium, dysprosium, erbium and mixtures of two or more of such rare earth metals, and (3) alpha alumina making up the balance of 100% by weight. The rare earth metal oxide will usually react with aluminum oxide to form a rare earth metal-aluminum oxide reaction product. The oxide of the reaction product dysprosium and gadolinium with aluminum will generally be a garnet, while the oxide of the reaction product of praseodymium, ytterbium, erbium and samarium with aluminum will generally be a perovskite which may include garnet. On the other hand, the reaction of lanthanum and aluminum causes conversion of the alumina to the beta form.

Certain reactions of rare earth metal oxides, divalent meta oxides and aluminum oxide produce hexagonal rare earth aluminates and thereby produce abrasive grits having the alpha alumina phase and a hexagonal aluminate phase. The hexagonal aluminate phase may coexist, of course, with other phases in the alpha alumina phase, depending upon the starting materials. For example, the alpha alumina phase may include a spinel phase and a hexagonal rare earth aluminate phase. Other phases such as garnet and perovskite may also be present depending on starting materials.

While hexagonal rare earth aluminates are known as luminescent materials, they are not known in a form useful to provide abrasive grits. The abrasive grits having the hexagonal rare earth aluminate structure have been found to have surprisingly superior abrasive performance when employed to abrade stainless steel. The hexagonal rare earth aluminate structure is usually obtained when making ceramic abrasive grits according to the invention by selecting as starting materials for processing with the alumina hydrate a compound including a divalent metal ion of a metal such as Mg, Ni, Zn, Co, Fe, or Mn and a compound including a trivalent rare earth metal ion of a metal such as La, Nd, Ce, Pr, Sm or Eu.

Preferred abrasive grits according to the invention which include the hexagonal rare earth aluminate phase are free of yttria and are nucleated with alpha $Fe_2O_3$ precursor particles of a size which promotes nucleation. The particle size of the useful nucleating material is characterized on the basis of its surface area with preferred alpha $Fe_2O_3$ precursor nucleating particles having a surface area of at least 5 $m^2/g$, preferably in the range of about 50–200$m^2/g$ (most preferably about 200 $m^2/g$). Nucleating particles of a size which has a surface area greater than 200 $m^2/g$ would appear to provide even better results although some undesirable flocculation may be observed, making processing difficult. Other nucleating materials may also be useful.

Preferred ceramic abrasive grits of the present invention comprise at least about 0.5% (preferably about 1% to about 30%) by weight rare earth metal oxide and about 0.25 to 30 percent by weight yttria, with the balance of 100% by weight comprising alpha alumina.

The general process of making the ceramic abrasive grits of the invention comprises the steps of:
  a. combining alumina hydrate with a rare earth metal oxide or its precursor dispersed (e.g., dissolved) in a liquid vehicle such as water to produce a blend;
  b. drying the blend to produce a dried solid;
  c. crushing the dried solid to produce particles;
  d. calcining the particles to substantially remove bound volatile materials; and
  e. firing the particles to produce a ceramic material.

One preferred method of making the ceramic abrasive grits is a sol gel method comprising the steps of:
  a. preparing a mixture of an aqueous dispersion of alumina hydrate, preferably the mondyhydrate (e.g., boehmite), and an oxide of the rare earth metal or a precursor of the oxide in an amount to provide at least about 0.5% by weight rare earth metal oxide in the ceramic upon firing;
  b. gelling the mixture;
  c. drying the gel to produce a dried solid;
  d. crushing the dried solid to produce particles;
  e. calcining the particles to substantially remove bound volatile materials; and
  f. firing the particles to produce a ceramic material.

Another preferred method of making the ceramic abrasive grits is an impregnation method comprising the steps of:
  a. preparing a sol of alumina hydrate, preferably the monohydrate (e.g., boehmite);
  b. drying the sol to form a porous dried solid comprised of the dried sol;
  c. crushing the dried solid to produce particles;
  d. preparing a homogeneous mixture of rare earth metal oxide or its precursor, preferably a water soluble salt, in a liquid vehicle such as water;
  e. calcining the particles to remove water of hydration and convert the alumina monohydrate to a form of alumina which is in said liquid vehicle insoluble;
  f. impregnating the the mixture of step (d) into the calcined particles to achieve an average concentration of rare earth metal oxide in the resultant ceramic of at least about 0.5% by weight upon firing to produce a ceramic;
  g. drying the impregnated particles;
  h. calcining the dried impregnated particles to substantially remove bound volatile materials; and
  i. firing the particles to produce a ceramic. The invention also provides various abrasive products of a type which includes abrasive grits characterized in that at least part of the abrasive grits are the ceramic abrasive grits of the invention. Preferred abrasive articles include coated abrasive products, bonded abrasive products such as grinding wheels, and nonwoven abrasive products in a form similar to that sold under trade designation Scotchbrite ® by the 3M Company.

DETAILED DESCRIPTION

The preparation of the ceramic abrasive grits of the present invention from a sol-gel process first includes the preparation of a dispersion usually comprising about 2 to about 60 weight percent aluminum oxide monohydrate (e.g., boehmite). The preparation of the ceramic abrasive grits from an impregnation process also first includes the preparation of a dispersion of aluminum oxide monohydrate but usually comprising a somewhat more concentrated dispersion, typically comprising about 10 to about 60 weight percent aluminum oxide monohydrate.

The boehmite can either be prepared from various techniques well known in the art or can be acquired commercially from a number of suppliers. Examples of commercially available materials include that available under the trade designation Disperal ® produced by Condea Chemie, GMBH and that available under the trade designation Catapal ® S.B., produced by Vista Chemical Company. These aluminum oxide monohydrates are typically in the alphaform, are relatively pure, include relatively little, if any, hydrate phases other than the monohydrate, and have a high surface area.

A peptizing agent is usually added to the boehmite dispersion to produce a more stable hydrosol or colloidal dispersion. Monoprotic acids or acid compounds which may be used as the peptizing agent include hydrochloric, acetic, and nitric acid. Nitric acid is a preferred peptizing agent. Multiprotic acids are normally avoided since they rapidly gel the dispersion, making it difficult to handle or mix with additional components. Some commercial sources of boehmite contain acid titer, such as absorbed formic or nitric acid, to assist in forming a stable dispersion.

Sufficient rare earth metal compound is added in the sol gel process to the dispersion to provide at least about 0.5% by weight and preferably about 1 to 30 % by weight rare earth metal oxide after firing.

The same approximate level of rare earth metal oxide will typically be the goal of the impregnation process, but the concentration will be the average concentration throughout each fired porous structure that was impregnated. It should be understood that the impregnation process typically produces impregnated porous structures with higher concentrations of rare earth metal oxide at or near the surface than at the interior of the impregnated structure. Crushing such porous structures will produce fragments which may have surfaces corresponding to the higher concentration original impregnated structure surfaces or the lower concentration interior portion of such structure.

The preferred rare earth metal precursor is a salt of a volatile anion. Rare earth metal salts having volatile anions include, for example, the rare earth metal nitrate, formate, acetate or the like. The most readily available chemical form of rare earth metal is typically the oxide which is easily converted to a salt with a volatile anion by reaction with an excess of concentrated nitric acid to produce nitrate solution which can conveniently be introduced into the aluminum oxide monohydrate dispersion or the porous alumina body in the desired amount. Rare earth metal salts and compounds which remain stable and have anions which do not volatilize at least at the firing temperature of the ceramic material should be avoided since they generally do not react with alumina to form the desired rare earth metal-aluminum oxide reaction product, as will hereinafter be explained. The rare earth metal may also be introduced as the oxide, for example, as finely divided hydrated particles as in a sol.

The aluminum oxide monohydrate dispersion may be formed by any suitable means which may simply be the mixing of the aluminum oxide monohydrate with water containing the peptizing agent or by forming an aluminum oxide monohydrate slurry to which the peptizing agent is added. Once the dispersion is formed, it is preferably then gelled for the sol gel process. The gel can be formed by any conventional technique but is preferably formed by adding the salt in sufficient concentration as to cause the dispersion to gel.

The dispersion may contain a nucleating agent to enhance the transformation to alpha alumina. Suitable nucleating agents include fine particles of alpha alumina, alpha ferric oxide or its percursor and any other material which will nucleate the transformation. The amount of nucleating agent is sufficient to effect nucleation. Nucleating such dispersions is disclosed in assignee's U.S. Pat. No. 4,734,104 the disclosure of which is incorporated herein by reference.

The dispersion may contain one or more precursors of one or more other modifying additives which can be added to enhance some desirable property of the finished product or increase the effectiveness of the sintering step. These additives may also be in the form of soluble salts, typically water soluble, and typically consist of a metal-containing compound which can be a precursor of the oxides of magnesium, zinc, cobalt, nickel, zirconium, and hafnium. The addition of metal-containing compounds, such as those containing magnesium, zinc, cobalt and nickel, which form a spinel crystal structure, has generally been found to produce better abrasive grits than ceramics which do not contain spinel.

Once the gel has formed, it may be shaped by any convenient method such as pressing, molding or extrusion and then carefully dried to produce the desired shape such as a rod, pyramid, diamond, cone and the like. Irregularly-shaped abrasive grits are conveniently formed by simply depositing the gel in any convenient size of drying vessel such as one in the shape of a cake pan and drying the gel, usually at a temperature below the frothing temperature of the gel.

Drying may be accomplished by simply air drying or using any of several other dewatering methods that are known in the art to remove the free water of the gel to form a solid. Preferred drying methods are those which minimize loss of soluble metal salts. After the solid is dried, it can be crushed or broken by any suitable means, such as a hammer or ball comminuting the solid can be used and the term "crushing" is used to include all of such methods.

For producing abrasive grain by the impregnation method, the sol dispersion may be placed directly into a dryer where gellation will occur as water is removed. If a shaped grain is desired, then the sol may be gelled by the addition of an ammonium salt or excess acid and then formed into the desired shape and processed as described above.

After crushing, the dried material can then be calcined to remove essentially all volatiles. The dry material is generally heated to a temperature between 400° C. and about 800° C. and held within this temperature range until the free water and a substantial amount of the bound water is removed, preferably over 90 weight percent of the total water.

Impregnation may be accomplished on the undoped calcined material in a single impregnation, i.e., using only one impregnation solution a single time, or it may be accomplished in several impregnation steps. That is, more than one impregnation solution may be applied to a particular porous structure. For example, the same impregnation solution may be applied once, and then again, to increase the concentration in the porous structure of the solids being carried in the impregnation solution. The subsequent impregnation solution may also have a different concentration of solids and/or a combination of different solids. For example, the first solution may contain one rare earth metal salt and the second solution may contain a different one. Between each impregnation step, excess solution may be removed by filtering or centrifuging, and the impregnated material is then dried and calcined again as described above to remove volatile species of the dopant compounds introduced during the impregnation step.

The calcined material is then sintered by heating to a temperature between about 1200° C. to about 1650° C. and holding within this temperature range until substantially all of the rare earth metal oxide reacts with aluminum oxide to thereby be converted to the oxide of the rare earth metal-aluminum reaction product and until substantially all of the remaining alumina is converted to a fired form, typically the alpha alumina. Of course, the length of time to which the calcined material must be exposed to the sintering temperature to achieve this level of conversion will depend upon various factors. The time required for sintering can range from seconds to about 30 minutes.

Other steps can be included in this process, such as rapidly heating the material from the calcining temperature to the sintering temperature, sizing granular material, centrifuging the dispersion to remove sludge waste, etc. Moreover, this process may be modified by combining two or more of the individually described steps, if desired.

The conventional process steps and materials are more fully described in U.S. Pat. No. 4,314,827 and U.S. Pat. No. 4,518,397, these patents being herein incorporated by reference.

The ceramic materials according to the invention may have a density varying from near its theoretical density, e.g., 95% or greater, to about 75%. The ceramic material may be substantially void free or it may be characterized by including porosity, typically in the form of internal vermicular or equiaxial pores which are for the most part on the interior of the ceramic with a minor part of the pores extending to the surface. Porosity is very difficult to measure accurately by conventional porosity measuring techniques because the porosity is a mix of closed pores which do not extend to the surface and open pores which do.

The ceramic abrasive grits according to the present invention may be utilized in conventional abrasive products, preferably as a blend with less expensive conventional abrasive grits such as fused alumina, silicon carbide, garnet, fused alumina-zirconia and the like. It may also be blended with minerals or materials which are not noted as abrasives such as calcium carbonate, glass, and the like.

Because of the relatively high cost of the rare earth metal compounds, it is preferred to blend the ceramic abrasive grits of the present invention with less expensive abrasive minerals. Such blending of abrasive grits is known. A preferred method of blending is described in assignee's U.S. Pat. No. 4,734,104 involving a method known as selective mineral substitution wherein the coarse abrasive mineral is removed from an inexpensive abrasive grit charge that is to be utilized in an abrasive product such as a coated abrasive and is substituted with coarse mineral of the invention. It is recognized in that patent application that in any coated abrasive the coarse abrasive grits are substantially responsible for a major portion of the abrading of a workpiece. By such substitution, the improved abrasive grits of the present invention are interposed in an abrasive product between smaller grits of conventional abrasive mineral to permit the improved coarse abrasive grits to do the bulk of the abrading with such product. Aforementioned U.S. Pat. No. 4,734,104 is incorporated herein by reference for its disclosure of this feature.

The ceramic abrasive grits of the present invention are conveniently handled and incorporated into various abrasive products according to well-known techniques to make, for example, coated abrasive products, bonded abrasive products, and lofty non-woven abrasive products. The methods of making such abrasive products are well-known to those skilled in the art. A coated abrasive product includes a backing, for example, formed of fabric (e.g., woven or non-woven fabric such as paper) which may be saturated with a filled binder material, a polymer film such as that formed of oriented heat-set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

It has been found that the addition of a grinding aid over the surface of the abrasive grits typically in the supersize coating provides an improved grinding performance when using a coated abrasive product containing the ceramic abrasive grits of the present invention. Grinding aids may also be added to the size coat or as particulate material. The preferred grinding aid is $KBF_4$, although other grinding aids are also believed to be useful. Other useful grinding aids include NaCl, sulfur, $K_2TiF_6$, polyvinyl chloride, polyvinylidene chloride, cryolite and combinations and mixtures thereof. The preferred amount of grinding aid is on the order of 50 to 300 g., preferably 80 to 160 g. per square meter of coated abrasive product.

Non-woven abrasive products typically include an open porous lofty polymer filament structure having the ceramic abrasive grits distributed throughout the structure and adherently bonded therein by an adhesive material. The method of making such non-woven abrasive products is well known.

Bonded abrasive products typically consist of a shaped mass of abrasive grits held together by an organic or ceramic binder material. The shaped mass is preferably in the form of a grinding wheel. The preferred binder materials for the ceramic abrasive grits of the invention are organic binders. Ceramic or vitrified binders may be used if they are curable at temperatures and under conditions which will not adversely affect the ceramic abrasive grits of the present invention.

EXAMPLES

The following examples are illustrative of certain specific embodiments of this invention; however, these examples are for illustrative purposes only and are not to be construed as limitations upon the invention. All parts are by weight, unless otherwise specified.

EXAMPLES 1-61

Abrasive grits were prepared by sol gel process as follows:

Room temperature deionized water (2600 ml), 48 g of 16N analytical reagent grade nitric acid and 800 g alpha aluminum oxide monohydrate powder sold under the trade designation Disperal ® were charged into an 18.9 liter polyethylene lined steel vessel. The charge was dispersed at high speed for five minutes using a Giford-Wood Homogenizer Mixer (Greeco Corp., Hudson, N.H.). The resulting dispersion and an aqueous solution containing the nitrate salt of the rare earth metal were metered through an in-line mixer in an amount to provide the weight of rare earth metal nitrate solution specified in Table I. The resulting gel was extruded into a 46 cm × 66 cm × 5 cm polyester-lined aluminum tray where it was dried in a forced air oven at 100° C. to a friable solid.

The resultant dried material was crushed using a "Braun" type UD pulverizer having a 1.1 mm gap between the steel plates. The crushed material was screened and the 0.125 mm to about 1 mm screen size material was retained for firing.

The screened, crushed material was fed into the end of a calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 15 minutes. The calciner had a hot zone feed end temperature of 350° C. and exit end temperature of 800° C. The fired product from calciner was fed into a 1380° C. kiln which was a 8.9 cm diameter 1.32 meter long silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

Impregnation Method

Room temperature deionized water (2600 ml), 48 g of 16N analytical reagent grade nitric acid and 800 g alpha aluminum oxide monohydrate powder sold under the trade designation Disperal ® were charged into an 18.9 liter polyethylene-lined steel vessel. The charge was dispersed at high speed for five minutes using a Gifford-Wood Homogenizer Mixer (Greeco Corp., Hydson, N.H.). The resulting sol was poured into a 46 cm×66 cm×5 cm polyester-lined aluminum tray where it was dried in a air oven at 100° C. to a friable solid.

The resultant dried material was crushed using a "Braun" type UD pulverizer having a 1.1 mm gap between the steel plates. The crushed material was screened and the 0.125 mm to about 1 mm screen size material was retained and was fed into the end of a calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 15 minutes. The calciner had a hot zone feed end temperature of 350° C. and exit end temperature of 800° C.

The prefired material (100 grams) was added to 300 ml of the rare earth nitrate solution of the concentration given in Table I contained in a 500 ml glass filtering flask. An aspirator was used to pull a partial vacuum above the solution which allowed air trapped within the porosity of the grits to escape, and the rare earth nitrate solution to completely infiltrate the porosity. The partial vacuum was maintained for about one minute, after which the excess nitrate solution was removed by filtering the saturated grits over No. 4 filter paper. The grits were dried in a forced air oven at 100° C., then fed through a rotary calciner as described previously. For multiple impregnations, the prefired material was allowed to cool and was then impregnated again in the desired solution. Excess solution was removed, the material was dried and prefired again. This process may be repeated as often as necessary to obtain the desired concentration and composition of rare earth oxide.

The fired product from the calciner was fed into a 1380° C. kiln which was a 8.9 cm diameter 1.32 meter long silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

Table I sets forth details about the preparation of Examples 1-61. These examples involve the use of only one rare earth oxide modifier. Table I contains the relative amounts of alumina and modifier and the type of modifier. The modifier is shown as the rare earth metal oxide for convenience but it will typically be present as a complex crystal structure with the alumina, as previously explained. This crystal structure is also set forth in Table I. The process of making the ceramic is also identified in Table I. "S/G" means that the ceramic was made by the sol gel process. "IMP" means that the ceramic was made by the impregnation process. The weight of the rare earth metal nitrate is identified (in grams, "g") used in the sol gel process to make the mixture with the alumina monohydrate.

The concentration of aqueous solution of rare earth metal nitrate employed in each case, sol gel and impregnation, is also given. Where two concentrations appear for a particular example, e.g., "23/23" for Example 1, this means that the porous alumina hydrate body was impregnated twice. In Example 1, the concentration of the rare earth nitrate was the same in each impregnation. In Example 6, however, the first impregnation was with a 23% solution while the second impregnation was with a 15% solution.

TABLE I

| Ex. No. | $Al_2O_3$ % | Rare Earth Metal Oxide (Type) | (%) | Crystal Structure | Process | Rare Earth Metal Nitrate Solution wt (g) | solids (%) |
|---|---|---|---|---|---|---|---|
| 1 | 74 | $Dy_2O_3$ | 26 | Garnet | IMP. | — | 23/23 |
| 2 | 84.3 | " | 15.7 | " | " | — | 23 |
| 3 | 90.7 | " | 9.3 | " | " | — | 15 |
| 4 | 94.5 | " | 5.5 | " | " | — | 10 |
| 5 | 96.7 | " | 3.3 | " | " | — | 5 |
| 6 | 82.7 | " | 17.3 | " | " | — | 23/15 |
| 7 | 82.7 | " | 17.3 | " | " | — | 23/15 |
| 8 | 94 | $La_2O_3$ | 6 | Beta $Al_2O_3$ | " | — | 11.3 |
| 9 | 94 | " | 6 | " | " | — | 11.3 |
| 10 | 85.2 | $Gd_2O_3$ | 14.8 | Garnet | " | — | 23 |
| 11 | 85.2 | " | 14.8 | " | " | — | 23 |
| 12 | 85 | $Dy_2O_3$ | 15 | " | S/G | 460 | 23 |
| 13 | 90 | " | 10 | " | " | 290 | 23 |
| 14 | 95 | " | 5 | " | " | 137 | 23 |
| 15 | 97.5 | " | 2.5 | " | " | 67 | 23 |
| 16 | 99 | " | 1.0 | " | " | 26 | 23 |
| 17 | 99.5 | " | 0.5 | " | " | 13 | 23 |
| 18 | 87.5 | $CeO_2$ | 12.5 | $CeO_2$ | S/G | 357 | 24 |
| 19 | 90 | " | 10 | " | " | 278 | 24 |
| 20 | 92.5 | " | 7.5 | " | " | 203 | 24 |
| 21 | 95 | " | 5 | " | " | 132 | 24 |
| 22 | 97.5 | " | 2.5 | " | " | 64 | 24 |
| 23 | 89.6 | " | 1 | " | " | 25 | 24 |
| 24 | 89.4 | $Pr_2O_3$ | 10.6 | Perovskite | IMP | — | 22.5 |
| 25 | 89.6 | " | 10.4 | " | " | — | 20 |
| 26 | 90.9 | " | 9.1 | " | " | — | 17.5 |
| 27 | 91.8 | " | 8.2 | " | " | — | 15 |

TABLE I-continued

| Ex. No. | $Al_2O_3$ % | Rare Earth Metal Oxide (Type) | (%) | Crystal Structure | Process | Rare Earth Metal Nitrate Solution wt (g) | solids (%) |
|---|---|---|---|---|---|---|---|
| 28 | 94.6 | " | 5.4 | " | " | — | 12.5 |
| 29 | 95. | " | 5 | " | " | — | 10 |
| 30 | 87 | $Yb_2O_3$ | 13 | Perovskite and garnet | " | — | 22.5 |
| 31 | 88.6 | " | 11.4 | " | " | — | 17.5 |
| 32 | 91.3 | " | 8.7 | " | " | — | 12.5 |
| 33 | 87.7 | $Er_2O_3$ | 12.3 | " | " | — | 22.5 |
| 34 | 91.4 | " | 8.6 | " | " | — | 17.5 |
| 35 | 95 | " | 5 | " | " | — | 12.5 |
| 36 | 90 | $La_2O_3$ | 10 | Beta-$Al_2O_3$ | S/G | 513 | 13.0 |
| 37 | 92.5 | " | 7.5 | " | " | 374 | 13.0 |
| 38 | 95 | " | 5 | " | " | 243 | 13.0 |
| 39 | 97.5 | " | 2.5 | " | " | 118 | 13.0 |
| 40 | 99 | " | 1 | " | " | 47 | 13.0 |
| 41 | 99.5 | " | 0.5 | " | " | 23 | 13.0 |
| 42 | 92.4 | $Sm_2O_3$ | 7.6 | Perovskite | IMP | — | 13.1 |
| 43 | 95.7 | " | 4.3 | " | " | — | 8.7 |
| 44 | 88.2 | " | 11.8 | " | " | — | 17.4/8.7 |
| 45 | 82.5 | $Nd_2O_3$ | 17.5 | " | S/G | 1060 | 12 |
| 46 | 85 | " | 15 | " | " | 882 | 12 |
| 47 | 87.5 | " | 12.5 | " | " | 714 | 12 |
| 48 | 90 | " | 10 | " | " | 556 | 12 |
| 49 | 95 | " | 5 | " | " | 263 | 12 |
| 50 | 98 | " | 2 | " | " | 102 | 12 |
| 51 | 73.5 | $Sm_2O_3$ | 26.5 | " | " | 1386 | 15.6 |
| 52 | Unknown | " | Unknown | " | IMP | — | 18.4 |
| 53 | Unknown | $La_2O_3$ | Unknown | Beta-$Al_2O_3$ | IMP | — | 18.1 |
| 54 | Unknown | " | Unknown | " | " | — | 11.3 |
| 55 | Unknown | " | Unknown | " | " | — | 15 |
| 56 | Unknown | " | Unknown | " | " | — | 18.8 |
| 57 | 97.7 | " | 2.3 | " | S/G | — | 13 |
| 58 | 95.4 | " | 4.6 | " | " | — | 13 |
| 59 | 94.2 | " | 5.8 | " | " | — | 13 |
| 60 | 91.9 | " | 8.1 | " | " | — | 13 |

EXAMPLES 61-98

Table II reveals information regarding the preparation of ceramic abrasive grits which contain mixtures of rare earth metal oxides as modifiers. All of these examples were prepared by the sol gel method described for the earlier examples with the exception that the amounts of ingredients listed in Table II were used.

TABLE II

| | Ceramic composition | | | | | Concentrations and Amounts of Starting Materials | | | | | | | | | |
|---|---|---|---|---|---|---|---|---|---|---|---|---|---|---|---|
| Ex. No. | $Al_2O_2$ (%) | $La_2O_3$ (%) | $Nd_2O_3$ (%) | $Y_2O_3$ (%) | MgO (%) | $Al_2O_3.H_2O$ (g) | (%) | $LaNO_3$ (g) | $La_2O_3$ (%) | $NdNO_3$ (g) | $Nd_2O_3$ (%) | $YNO_3$ (g) | $Y_2O_3$ (%) | $MgNO_3$ (g) | MgO (%) |
| 61 | 88 | 3 | 3 | 3 | 3 | 506 | 17.4 | 11.5 | 26 | 25.4 | 11.8 | 13 | 23 | 54.5 | 5.5 |
| 62 | 94 | 1.5 | 1.5 | 1.5 | 1.5 | 540 | 17.4 | 5.7 | 26 | 12.7 | 11.8 | 6.5 | 23 | 27.3 | 5.5 |
| 63 | 88 | 2 | 2 | 6 | 2 | 506 | 17.4 | 7.7 | 26 | 16.9 | 11.8 | 26.1 | 23 | 36.4 | 5.5 |
| 64 | 94 | 1 | 1 | 3 | 1 | 540 | 17.4 | 3.8 | 2 | 8.5 | 11.8 | 13 | 23 | 18.2 | 5.5 |
| 65 | 94 | 1.5 | 1.5 | 1.5 | 1.5 | 540 | 17.4 | 5.7 | 26 | 12.7 | 11.8 | 6.5 | 23 | 27.3 | 5.5 |
| 66 | 94 | 2 | 2 | 0 | 2 | 540 | 17.4 | 7.7 | 26 | 16.9 | 11.8 | 0 | — | 36.4 | 5.5 |
| 67 | 94 | 1.75 | 1.75 | 0.75 | 1.75 | 540 | 17.4 | 6.7 | 26 | 14.8 | 11.8 | 3.3 | 23 | 31.8 | 5.5 |
| 68 | 91 | 2.25 | 2.25 | 2.25 | 2.25 | 523 | 17.4 | 8.6 | 26 | 19.1 | 11.8 | 9.8 | 23 | 40.9 | 5.5 |
| 69 | 97 | 0.75 | 0.75 | 0.75 | 0.75 | 557 | 17.4 | 2.9 | 26 | 6.4 | 11.8 | 3.3 | 23 | 13.6 | 5.5 |
| 70 | 92 | 2 | 2 | 2 | 2 | 119 | 17.4 | 4 | 11.3 | 4 | 11.3 | 4 | 11.3 | 4 | 11.3 |
| 71 | 96 | 1 | 1 | 1 | 1 | 124 | 17.4 | 2 | 11.3 | 2 | 11.3 | 2 | 11.3 | 2 | 11.3 |
| 72 | 94 | 1 | 1 | 3 | 1 | 122 | 17.4 | 2 | 11.3 | 2 | 11.3 | 6 | 11.3 | 2 | 11.3 |
| 73 | 94 | 1 | 3 | 1 | 1 | 122 | 17.4 | 2 | 11.3 | 6 | 11.3 | 2 | 11.3 | 2 | 11.3 |
| 74 | 92 | 1 | 3 | 3 | 1 | 119 | 17.4 | 2 | 11.3 | 6 | 11.3 | 6 | 11.3 | 2 | 11.3 |
| 75 | 94 | 1 | 1 | 1 | 3 | 122 | 17.4 | 2 | 11.3 | 2 | 11.3 | 2 | 11.3 | 6 | 11.3 |
| 76 | 92 | 1 | 1 | 3 | 3 | 120 | 17.4 | 2 | 11.3 | 2 | 11.3 | 6 | 11.3 | 6 | 11.3 |
| 77 | 92 | 1 | 3 | 1 | 3 | 120 | 17.4 | 2 | 11.3 | 6 | 11.3 | 2 | 11.3 | 6 | 11.3 |
| 78 | 90 | 1 | 3 | 3 | 3 | 117 | 17.4 | 2 | 11.3 | 6 | 11.3 | 6 | 11.3 | 6 | 11.3 |
| 79 | 94 | 3 | 1 | 1 | 1 | 122 | 17.4 | 6 | 11.3 | 2 | 11.3 | 2 | 11.3 | 2 | 11.3 |
| 80 | 92 | 3 | 1 | 3 | 1 | 120 | 17.4 | 6 | 11.3 | 2 | 11.3 | 6 | 11.3 | 2 | 11.3 |
| 81 | 92 | 3 | 3 | 1 | 1 | 120 | 17.4 | 6 | 11.3 | 6 | 11.3 | 2 | 11.3 | 2 | 11.3 |
| 82 | 90 | 3 | 3 | 3 | 1 | 117 | 17.4 | 6 | 11.3 | 6 | 11.3 | 6 | 11.3 | 2 | 11.3 |
| 83 | 92 | 3 | 1 | 1 | 3 | 121 | 17.4 | 6 | 11.3 | 2 | 11.3 | 2 | 11.3 | 6 | 11.3 |
| 84 | 90 | 3 | 1 | 3 | 3 | 117 | 17.4 | 6 | 11.3 | 2 | 11.3 | 6 | 11.3 | 6 | 11.3 |
| 85 | 90 | 3 | 3 | 1 | 3 | 117 | 17.4 | 6 | 11.3 | 6 | 11.3 | 2 | 11.3 | 6 | 11.3 |
| 86 | 88 | 3 | 3 | 3 | 3 | 114 | 17.4 | 6 | 11.3 | 6 | 11.3 | 6 | 11.3 | 6 | 11.3 |
| 87 | 92 | 2 | 2 | 2 | 2 | 120 | 17.4 | 4 | 11.3 | 4 | 11.3 | 4 | 11.3 | 4 | 11.3 |
| 88 | 94 | 2 | 2 | 0 | 2 | 122 | 17.4 | 4 | 11.3 | 4 | 11.3 | 0 | — | 4 | 11.3 |
| 89 | 90 | 2 | 2 | 4 | 2 | 117 | 17.4 | 4 | 11.3 | 4 | 11.3 | 8 | 11.3 | 4 | 11.3 |
| 90 | 94 | 2 | 0 | 2 | 2 | 122 | 17.4 | 4 | 11.3 | 0 | — | 4 | 11.3 | 4 | 11.3 |
| 91 | 90 | 2 | 4 | 2 | 2 | 117 | 17.4 | 4 | 11.3 | 8 | 11.3 | 4 | 11.3 | 4 | 11.3 |
| 92 | 94 | 2 | 2 | 2 | 0 | 122 | 17.4 | 4 | 11.3 | 4 | 11.3 | 4 | 11.3 | 0 | — |
| 93 | 90 | 2 | 2 | 2 | 4 | 117 | 17.4 | 4 | 11.3 | 4 | 11.3 | 4 | 11.3 | 8 | 11.3 |

TABLE II-continued

| Ex. No. | Ceramic composition | | | | | Concentrations and Amounts of Starting Materials | | | | | | | | | |
|---|---|---|---|---|---|---|---|---|---|---|---|---|---|---|---|
| | Al₂O₃ (%) | La₂O₃ (%) | Nd₂O₃ (%) | Y₂O₃ (%) | MgO (%) | Al₂O₃.H₂O (g) | Al₂O₃.H₂O (%) | LaNO₃ (g) | La₂O₃ (%) | Nd₂O₃ (g) | Nd₂O₃ (%) | YNO₃ (g) | Y₂O₃ (%) | MgNO₃ (g) | MgO (%) |
| 94 | 94 | 0 | 2 | 2 | 2 | 122 | 17.4 | 0 | — | 4 | 11.3 | 4 | 11.3 | 4 | 11.3 |
| 95 | 90 | 4 | 2 | 2 | 2 | 117 | 17.4 | 8 | 11.3 | 4 | 11.3 | 4 | 11.3 | 4 | 11.3 |
| 96 | 92 | 2 | 2 | 2 | 2 | 126 | 17.4 | 4 | 11.3 | 4 | 11.3 | 4 | 11.3 | 4 | 11.3 |
| 97 | 93.2 | 1.8 | 0 | 0 | 5.0 | — | — | — | — | — | — | — | — | — | — |
| 98 | 93.1 | 0.9 | 0 | 0 | 6.0 | — | — | — | — | — | — | — | — | — | — |

Abrasive grits of each of the examples were made into coated abrasive products which were tested for abrasiveness. The coated abrasive products were made according to conventional coated abrasive making procedures. The abrasive grits were screened to yield various grain sizes or abrasive grit grades and the desired grade selected for the particular construction. The abrasive grits were bonded to polyester or vulcanized fiber backings using conventional make, size, and optionally supersize adhesive resin compositions.

Table III reveals the grit size (grade), the composition of the abrasive grits, and grinding aid, if used, the total amount of metal removed in a ginding test (Total Cut) and the relative grinding performance according to a "disc test" (unless otherwise specified) as described below when compared to the performance of a standard consisting of commercial grades fused alumina-zirconia abrasive grits available under the trade designation Nor-Zon ®. In Table III, the given grade size refers to abrasive grit having an average diameter as follows:

| Grade | Average Diameter (micrometers) |
|---|---|
| 36 | 710 |
| 40 | 600 |
| 50 | 430 |

The term "disc" test refers to disc test hereinafter described.

The disc test involved the testing of 17.8 cm diameter abrasive discs having the following approximate coating weights:

| Grade | Make Resin | Mineral | Size Resin | Supersize |
|---|---|---|---|---|
| 36 | 4.2 g | 18.8 g | 13.6 g | 8 g |
| 40 | 4.2 g | 18.0 g | 13.0 g | 8 g |
| 50 | 4.2 g | 13.2 g | 8.7 g | 6 g |

Disc Test

The discs were prepared using conventional coated abrasive making procedures, conventional 0.76 mm vulcanized fiber backings and conventional calcium carbonate-filled phenolic resin make and size resins, without adjusting for mineral density differences. The make resin was precured for 90 minutes at 88° C. and the size resin precured for 90 minutes at 88° C. followed by a final cure of 100° C. for 10 hours. The coating was done using conventional techniques in a one-trip operation with curing in a forced air oven. The cured discs were first conventionally flexed to controllably break the hard bonding resins, mounted on a beveled aluminum back-up pad, and used to grind the face of a 2.5 cm by 18 cm 304 stainless steel workpiece. This disc was driven at 5,500 rpm while the portion of the disc overlaying the beveled edge of the back-up pad contacted the workpiece at 5.91 kg pressure generating a disc wear path of about 140 cm: Each disc was used to grind a separate workpiece for one minute each for a total time of 12 minutes each or for sufficient one minute time segments until no more than 5 grams of metal were removed in any one minute grinding cut. The total cut for each disc is reported in Table III. The relative cumulative cut of each of the 12 cuts (or for a lesser number of cuts, depending upon performance) for each disc, using the cumulative cut of a disc made of a control abrasive grain as 100%, was calculated and is also tabulated in Table III. All of the grinding data was generated using the Disc Test unless otherwise indicated in which case the grinding data was generated using an Abrasive Belt Test as described below.

Abrasive Belt Test

Grade 50 coated abrasive sheets were converted to 7.6 cm × 335 cm endless abrasive belts and tested on a constant load surface grinder, abrading the 2 ½cm × 18.4 cm face of a 304 stainless steel workpiece with 30 successive 60 second grinding passes, weighing and cooling after each pass, employing 25 lb pressure, a 2000 m/min belt speed, and ⅛ m/min workpiece feed rate.

TABLE III

| Ex. No. | Additive (Type) | (%) | Abrasive Grade | Grinding Aid | Total Cut (Grams) | Relative Cut (%) |
|---|---|---|---|---|---|---|
| 1 | Dy₂O₃ | 26 | 40 | — | 46 | 107 |
| 2 | " | 16 | 40 | — | 36 | 84 |
| 3 | " | 9 | 40 | — | 22 | 52 |
| 4 | " | 5 | 40 | — | 18 | 41 |
| 5 | " | 2 | 40 | — | 20 | 45 |
| 6 | " | 17 | 40 | — | 105 | 64 |
| 7 | " | 17 | 40 | KBF₄ | 354 | 215 |
| 8 | La₂O₃ | 6 | 36 | — | 57 | 88 |
| 9 | " | 6 | 36 | KBF₄ | 127 | 102 |
| 10 | Gd₂O₃ | 15 | 36 | — | 137 | 110 |
| 11 | " | 15 | 36 | KBF₄ | 231 | 186 |
| 12 | Dy₂O₃ | 15 | 36 | " | 292 | 252 |
| 13 | " | 10 | 36 | " | 271 | 234 |
| 14 | " | 5 | 36 | " | 140 | 121 |
| 15 | " | 2.5 | 36 | " | 90 | 78 |
| 16 | " | 1.0 | 36 | " | 76 | 66 |
| 17 | " | 0.5 | 36 | " | 31 | 27 |
| 18 | CeO₂ | 12.5 | 50 | " | 84 | 69 |
| 19 | " | 10 | 50 | " | 74 | 61 |
| 20 | " | 7.5 | 50 | " | 47 | 39 |
| 21 | " | 5 | 50 | " | 55 | 45 |
| 22 | " | 2.5 | 50 | " | 44 | 36 |
| 23 | " | 1 | 50 | " | 31 | 26 |
| 24 | Pr₂O₃ | 10.6 | 50 | " | 54 | 88 |
| 25 | " | 10.4 | 50 | " | 46 | 76 |
| 26 | " | 9.1 | 50 | KBF₄ | 47 | 76 |
| 27 | " | 8.2 | 50 | " | 45 | 74 |
| 28 | " | 5.4 | 50 | " | 118 | 194 |
| 29 | " | 5 | 50 | " | 147 | 241 |
| 30 | Yb₂O₃ | 13 | 50 | " | 125 | 204 |
| 31 | " | 11.4 | 50 | " | 100 | 164 |
| 32 | " | 8.7 | 50 | " | 85 | 140 |
| 33 | Er₂O₃ | 12.3 | 50 | KBF₄ | 197 | 322 |
| 34 | " | 8.6 | 50 | " | 152 | 249 |
| 35 | " | 5 | 50 | " | 114 | 186 |
| 36 | La₂O₃ | 10 | 50 | " | 142 | 71 |

TABLE III-continued

| Ex. No. | Additive (Type) | Additive (%) | Abrasive Grade | Grinding Aid | Total Cut (Grams) | Relative Cut (%) |
|---|---|---|---|---|---|---|
| 37 | " | 7.5 | 50 | " | 182 | 91 |
| 38 | " | 5 | 50 | " | 157 | 78 |
| 39 | " | 2.5 | 50 | " | 148 | 74 |
| 40 | " | 1 | 50 | " | 105 | 53 |
| 41 | " | 0.5 | 50 | " | 63 | 32 |
| 42 | $Sm_2O_3$ | 7.6 | 50 | " | 232* | 214 |
| 43 | " | 4.3 | 50 | " | 177 | 164 |
| 44 | " | 11.8 | 50 | " | 71 | 71 |
| 45 | $Nd_2O_3$ | 17.5 | 36 | " | 98 | 50 |
| 46 | " | 15 | 36 | " | 118 | 61 |
| 47 | " | 12.5 | 36 | " | 117 | 60 |
| 48 | " | 10 | 36 | " | 200 | 103 |
| 49 | " | 5 | 36 | " | 205 | 105 |
| 50 | " | 2 | 36 | $KBF_4$ | 124 | 64 |
| 51 | $Sm_2O_3$ | 26.5 | 36 | — | 90 | — |
| 52 | " | ? | 50 | — | 64 | — |
| 53 | $La_2O_3$ | ? | 50 | — | 85 | — |
| 54 | " | ? | 50 | — | 510* | 84* |
| 55 | " | ? | 50 | — | 429* | 70* |
| 56 | " | ? | 50 | — | 105* | 17* |
| 57 | " | 2.3 | 50 | — | 37 | — |
| 58 | " | 4.6 | 50 | — | 46 | — |
| 59 | " | 5.8 | 50 | — | 50 | — |
| 60 | " | 8.1 | 50 | — | 52 | — |

*Belt Abrasive Test

Table IV reveals the abrasive grinding disc tests of Examples 61-98. The disc tests for these examples were the same as for Examples 1-61 except all of the abrasive grits were grade 50 and the workpiece of Examples 97-98 was 1018 mild steel instead of 304 stainless steel without any grinding aid while the remaining Examples were tested with $kBF_4$ as a grinding aid.

TABLE IV

| Ex. No. | % Modifier $La_2O_3$ | $Nd_2O_3$ | $Y_2O_3$ | MgO | Grinding Results Total Cut (g) | Relative Cut (%) |
|---|---|---|---|---|---|---|
| 61 | 3 | 3 | 3 | 3 | 215 | 150 |
| 62 | 1.5 | 1.5 | 1.5 | 1.5 | 321 | 224 |
| 63 | 2 | 2 | 6 | 2 | 216 | 151 |
| 64 | 1 | 1 | 3 | 1 | 320 | 224 |
| 65 | 1.5 | 1.5 | 1.5 | 1.5 | 273 | 336 |
| 66 | 2 | 2 | 0 | 2 | 213 | 261 |
| 67 | 1.75 | 1.75 | 0.75 | 1.75 | 236 | 290 |
| 68 | 2.25 | 2.25 | 2.25 | 2.25 | 245 | 301 |
| 69 | 0.75 | 0.75 | 0.75 | 0.75 | 272 | 334 |
| 70 | 2 | 2 | 2 | 2 | 227 | 249 |
| 71 | 1 | 1 | 1 | 1 | 246 | 270 |
| 72 | 1 | 1 | 3 | 1 | 279 | 306 |
| 73 | 1 | 3 | 1 | 1 | 301 | 331 |
| 74 | 1 | 3 | 3 | 1 | 290 | 319 |
| 75 | 1 | 1 | 1 | 3 | 256 | 281 |
| 76 | 1 | 1 | 3 | 3 | 255 | 280 |
| 77 | 1 | 3 | 1 | 3 | 285 | 313 |
| 78 | 1 | 3 | 3 | 3 | 249 | 274 |
| 79 | 3 | 1 | 1 | 1 | 271 | 297 |
| 80 | 3 | 1 | 3 | 1 | 272 | 300 |
| 81 | 3 | 3 | 1 | 1 | 280 | 308 |
| 82 | 3 | 3 | 3 | 1 | 291 | 320 |
| 83 | 3 | 1 | 1 | 3 | 238 | 262 |
| 84 | 3 | 1 | 3 | 3 | 239 | 263 |
| 85 | 3 | 1 | 3 | 247 | 271 | |
| 86 | 3 | 3 | 3 | 3 | 245 | 269 |
| 87 | 2 | 2 | 2 | 2 | 249 | 274 |
| 88 | 2 | 2 | 0 | 2 | 262 | 288 |
| 89 | 2 | 2 | 4 | 2 | 221 | 243 |
| 90 | 2 | 0 | 2 | 2 | 300 | 330 |
| 91 | 2 | 4 | 2 | 2 | 264 | 290 |
| 92 | 2 | 2 | 2 | 0 | 276 | 303 |
| 93 | 2 | 2 | 2 | 4 | 258 | 284 |
| 94 | 0 | 2 | 2 | 2 | 304 | 334 |
| 95 | 4 | 2 | 2 | 2 | 229 | 252 |
| 96 | 2 | 2 | 2 | 2 | 295 | 324 |
| 97 | 1.8 | 0 | 0 | 5.0 | 947* | — |
| 98 | 0.9 | 0 | 0 | 6.0 | 1048* | — |

*1018 Mild Steel

As stated above, certain reactions of rare earth metal oxide, divalent metal oxide and aluminum oxide produce hexagonal rare earth aluminates. These materials are thought to have the general formula $LnMAl_{11}O_{19}$ where Ln is a rare earth metal and M is a +2 valent metal which will form a spinel with alumina. They have the magnetoplumbite crystal structure, $PbFe_{12}O_{19}$, in which $Al^{+3}$ substitutes for all but one $Fe^{+3}$ in the lattice, $Ln^{+3}$ replaces $Pb^{+2}$ and $M^{+2}$ takes place of the remaining $Fe^{+3}$. The hexagonal unit cell consists of spinel blocks with Al(M) ions in tetragonal and octahedral sites separated by mirror planes containing oxygen ions and the rare earth ions. The Al(M) and rare earth cations are trigonal bipyramidly coordinated. This structure differs from the beta-alumina structure only in that the mirror plane which separates the spinel blocks is full in the magnetoplumbite structure.

The number of compounds which may exist is large due to the large possibility of substitutions which may occur at both the $Ln^{+3}$ and the $M^{+2}$ sites. At the former sites, La, Pr Nd, Sm, Eu, and Ce may substitute, while Mg, Mn Co, Ni, and Zn may occupy the $M^{+2}$ sites. Of these possible compounds, the ones containing Nd, La and Ce are of greatest interest for abrasive applications due to their relatively low cost. Gallium may also substitute totally or partially for aluminum while retaining the magnetoplumbite structure.

EXAMPLE 99

Abrasive grits having a hexagonal rare earth aluminate structure were prepared by solgel process which was similar to that described in Example 1.

Into an 18.9 liter polyethylene-lined steel vessel were charged 2000 g of room temperature deionized water, 168 g of 16N analytical reagent grade nitric acid and 2824 g of alpha aluminum oxide monohydrate powder (available under the trade designation Disperal[198]) to produce a sol. The sol was dispersed at high speed for five minutes using a Gifford - Wood homogenizer mixer (Greeco Corp., Hudson N.H.). Next, 250 g of an aqueous solution of magnesium nitrate hexahydrate (11.3% MgO solids), 101 g of an aqueous solution of neodymium nitrate hexahydrate solution (28% $Nd_2O_3$ solids) and 101g of an aqueous solution of lanthanum nitrate hexahydrate solution (28% solids $La_2O_3$) were thoroughly mixed into the sol thereby forming a thick gel. This gave a mixture which after firing as determined by elemental analysis would contain 97% aluminum oxide, 1% MgO, 1% $Nd_2O_3$ and 1% $La_2O_3$ and would have a hexagonal aluminate crystal structure as a secondary phase in alpha alumina. The gel was then extruded into a 46 cm×66×5 cm polyester-lined aluminum tray where it was dried in a forced air oven at 100° C. to a friable solid.

The resultant dried material was then crushed, screened, calcined, and fired, as described in Example 1, to produce ceramic abrasive grit according to the present invention. The ceramic abrasive grit was screened through a 35 mesh screen (U.S. standard screen size) and was held on a 40 mesh screen. A screened fraction of fused, heat-treated aluminum oxide abrasive grit which passed through a 45 mesh screen and was held on a 50 mesh was collected. The collected fractions of the ceramic and the fused abrasive grits were blended in a ratio of 15 parts ceramic grits to 85 parts fused aluminum oxide grits and the mineral blend was used to make a coated abrasive product which was tested in belt form for abrasiveness. The coated abrasive belt was prepared in a conventional manner using a polyester backing and conventional make and size resins. A supersize coating was also applied containing $KBF_4$ as a grinding aid.

The coated abrasive was converted to endless abrasive belts and tested on a constant load surface grinder by abrading the 2.5×18 cm face of a 304 stainless steel workpiece. Grinding was done for 60 second grinding passes at an interface pressure of 1.76 kg/cm$^2$, cooling and weighing after each pass. The workpiece was oriented with its long dimension vertical and during abrading was moved vertically in an 18.4 cm path in a cycle from its original position and back again for 30 minutes. Grinding results, are shown in Table V as the total amount of stainless steel removed and as a percent of a control coated abrasive belt. The control belt has as an abrasive material grade 50 fused abrasive material consisting of a blend of 60 parts by weight alumina-zirconia abrasive and 40 parts by weight fused alumina. The belt is commercially available from Norton Company under the trade designation NorZon™ E–864.

EXAMPLE 100

Abrasive grain according to the invention having a hexagonal rare earth metal aluminate structure was prepared using the same method as described in Example 99 except the choice of rare earth metal and weight of magnesium nitrate hexahydrate was different. The rare earth oxide was prepared from 733 grams a praseodymium nitrate hexahydrate solution (22.5% solids) and 365 grams of magnesium nitrate hexahydrate solution (11.3% solids). On a fired solids basis, the resulting mixture contained 93% aluminum oxide, 5.6% $Pr_2P_3$ and 1.4% MgO. The preparation of the abrasive grain, coated abrasive belts made therewith, and their testing was otherwise the same as that disclosed in Example 99. Grinding performance results are shown in Table V.

TABLE V

| | Grinding Performance | | |
|---|---|---|---|
| Example | Rare Earth Oxide | Total Cut (Grams) | % of Control |
| 99 | (La/Nd)MgAl$_{11}$O$_{19}$ | 1890 | 137 |
| 100 | PrMgAl$_{11}$O$_{19}$ | 2047 | 149 |
| NorZon ™ Control | None | 1376 | 100 |

These results clearly show that superior abrading performance of abrasive belts is achieved using ceramic abrasive grits containing hexagonal rare earth aluminates over abrasive grits of fused alumina-zirconia in coated abrasive constructions.

EXAMPLE 101

Ceramic abrasive grits having a hexagonal rare earth metal aluminate as a secondary phase in alpha alumina according to the invention were prepared by the sol gel method in the same manner as Example 99. After firing, the ceramic grits were screened and two screen cuts collected, the first passing through 30 mesh and being held by 35 mesh, and the second passing through 35 mesh and being held on 40 mesh. Equal weights of the two screen cuts were combined to provide a blend identified as grade 36 which was employed to prepare coated abrasive from which discs were cut. The description of the preparation and testing of coated abrasive discs is outlined above under the heading Disc Test. The test procedure was slightly modified. The workpiece was 1018 mild steel instead of 304 stainless steel. The pressure was 11.4 kg instead of 5.91 kg and the time interval was 12 minutes. The control was a laboratory sample made in the same manner as a Regal ™ Resin Bond Fiber Disc commercially available from the 3M Company, the assignee of the present application, which contained Cubitron ™ Ceramic abrasive grits produced by a sol gel process including magnesia spinel but not containing hexagonal rare earth aluminate. Grinding results are found in Table VI.

TABLE VI

| Example | Final Cut Grams | % of Control |
|---|---|---|
| 101 | 1262 | 120 |
| Control[1] | 1054 | 100 |

[1] Regal ™ Resin Bond Fiber Disc

This example shows that an abrasive disc containing ceramic abrasive grits according to the invention which include hexagonal rare earth aluminate exhibit significantly improved abrading performance grinding mild steel over that containing a ceramic abrasive material made by the sol gel process which does not include the hexagonal rare earth aluminates.

EXAMPLES 102 AND 103

Examples 102 and 103 compares the abrasiveness of abrasive grits containing oxides of aluminum and rare earth metal with and without a nucleating agent. These abrasive grits were prepared by the sol gel process which is similar to what is described in Example 1.

EXAMPLE 102

Into an 18.9 liter polyethylene lined steel vessel were charged 8897 g of room temperature deionized water, 138 g of 16N analytical reagent grade nitric acid, 2760 g of alpha aluminum oxide monohydrate powder (Disperal ™) and 216 g of an aqueous alpha iron oxide monohydrate dispersion (5% $Fe_2O_3$ solids). The charge was dispersed at high speed for five minutes using a Gifford - Wood Homogenizer Mixer (Greeco Corp., Hudson, N.H.). The alpha iron oxide monohydrate had a surface area of about 200 square meters/gram and acted as a nucleating agent. The resulting dispersions and an aqueous solution containing the nitrate salt of the rare earth metal were metered through an in-line mixer in an amount to provide the weight of rare earth metal nitrate solution specified in Table VII. The composition of each of these dispersions on a fired solids basis is specified in Table VII.

TABLE VII

| Example | $Al_2O_3$ | $Fe_2O_3$ | $La_2O_3$ Percent | $Nd_2O_3$ | MgO |
|---|---|---|---|---|---|
| 102 | 95.5 | 0.5 | 2 | .67 | 1.33 |
| 103 | 96.0 | 0.0 | 2 | .67 | 1.33 |

The gels were extruded into a 46 cm×66 cm×5 cm polyester lined aluminum tray and dried in a forced air oven at 100° C. to a friable solid.

The resultant dried material was crushed using a "Braun" Type UD pulverizer having a 1.1 mm gap between the steel plates. The crushed material was screened and the 0.125 mm to about 1 mm screen size material was retained for firing.

The screened, crushed material was fed into the end of a calciner which was a 14.5 cm diameter 1.25 meter long stainless steel tube rotating at 6 rpm, to provide residence time therein of about 3 minutes. The calciner had a exit end temperature of 600° C. The fired product from the calciner was feed into a 1390° C. kiln which was a 10.1 cm diameter 1.53 meter long silicon carbide tube rotating at 5.5 rpm to provide a residence time therein of about 3.8 minutes. The product exited the kiln into room temperature air where it was collected in a metal container and allowed to cool to room temperature.

The abrasive grits were screened to a grade 50 which has an average diameter of 430 micrometers. Each example of abrasive grits was used in a coated abrasive fiber disc and the procedure for making and testing the disc is given above under "Disc Test". The fiber disc also had a supersize, which included KBF$_4$ as the grinding aid. The workpiece was 304 stainless steel except a 1.2 cm width was used instead of 2.5 cm. Grinding performance can be found in Table VIII.

EXAMPLE 103

The abrasive grain for Example 103 was prepared and tested in the same manner as Example 102 except the alpha iron oxide monohydrate nucleating agent was not added and the amount of deionized water was 9102 grams.

TABLE VIII

| Example | Nucleated | Stainless Steel Removed % of Control |
|---|---|---|
| 102 | Yes | 197 |
| 103 | No | 167 |
| Control[1] | — | 100 |

[1]Made with grade 50 fused alumina:zirconia abrasive grits available under the trade designation NorZon ® from the Norton Company.

An increase in abrasive performance is readily apparent from the data of Table VIII by use of abrasive grits which contain the nucleating agent.

While this invention as been described in terms of specific embodiments, it should be understood that it is capable of further modifications. The claims herein are intended to cover those variations which one skilled in the art would recognize as the chemical equivalent of what has been described here.

I claim:

1. Alumina-based ceramic abrasive grits having a ceramic composition selected from the group consisting of
   (a) a first composition consisting of (1) up to 30% by weight yttria, (2) a reaction product of aluminum oxide and at least about 0.5% by weight of the oxide of a rare earth metal selected from the group consisting of praseodymium, samarium, ytterbium, neodymium, lanthanum, gadolinium, cerium, dysprosium, erbium, and mixtures of two or more of such rare earth metals, and (3) alpha alumina making up the balance of 100% by weight; and
   (b) a second composition comprising (1) up to 30% by weight of yttria, (2) a reaction product of aluminum oxide and at least about 0.5% by weight of the oxide of a rare earth metal selected from the group consisting of praseodymium, ytterbium, neodymium, lanthanum, gadolinium, dysprosium, erbium and mixtures of two or more of such rare earth metals, and (3) alpha alumina making up the balance of 100% by weight.

2. The ceramic abrasive grits of claim 1 further characterized by including about 0.25% to about 30% by weight yttria.

3. The ceramic abrasive grits of claim 1 wherein said aluminum oxide and rare earth metal oxide reaction product is in the form of a garnet phase.

4. The ceramic abrasive grits of claim 1 wherein said aluminum oxide and rare earth metal oxide reaction product is in the form of a perovskite phase.

5. The ceramic abrasive grits of claim 1 in which the rare earth metal oxide content is from about 1 to about 30% by weight.

6. The ceramic abrasive grits of claim 1 further including a nucleating agent.

7. The ceramic abrasive grits of claim 1 characterized by being shaped.

8. An abrasive product comprising said ceramic abrasive grits of claim 1.

9. The abrasive product of claim 8 wherein said abrasive product is a coated abrasive product comprising a backing having adhesively bonded to one side thereof abrasive grits comprising said ceramic abrasive grits.

10. The abrasive product of claim 8 wherein said abrasive product is a bonded abrasive product comprising a shaped mass of abrasive grits comprising said ceramic abrasive grits and binder materials.

11. The abrasive product of claim 10 wherein said shaped mass is in the form of a grinding wheel.

12. The abrasive product of claim 8 wherein said abrasive product is a lofty non-woven abrasive product comprising an open porous lofty polymer filament structure having abrasive grits comprising said ceramic abrasive grits distributed throughout said structure and adhesively bonded therein by an adhesive material.

13. A coated abrasive sheet material comprising a backing having bonded to at least one side thereof abrasive grits in coarse and fine size grades with at least a portion of the coarse grits being alumina-based ceramic abrasive grits having a ceramic composition selected from the group consisting of
   (a) a first composition consisting of (1) up to 30% by weight yttria, (2) a reaction product of aluminum oxide and at least about 0.5% by weight of the oxide of a rare earth metal selected from the group consisting of praseodymium, samarium, ytterbium, neodymium, lanthanum, gadolinium, cerium, dysprosium, erbium, and mixtures of two or more of such rare earth meals, and (3) alpha alumina making up the balance of 100%; and
   (b) a second composition comprising (1) up to 30% by weight of yttria, (2) a reaction product of aluminum oxide and at least about 0.5% by weight of the oxide of a rare earth metal selected from the group consisting of praseodymium, ytterbium, neodymium, lanthanum, gadolinium, dysprosium, erbium and mixtures of two or more of such rare earth metals, and (3) alpha alumina making up the balance of 100% by weight.

14. The coated abrasive sheet material of claim 9 wherein said ceramic abrasive grits are shaped.

15. The coated abrasive sheet material of claim 9 wherein said ceramic abrasive grits containing a nucleating agent.

16. The coated abrasive sheet material of claim 13 wherein substantially all of said coarse grits comprise said ceramic abrasive grits.

17. The coated abrasive sheet material of claim 9 wherein substantially all of said abrasive grits comprise said ceramic abrasive grits.

18. The coated abrasive sheet material of claim 9 further including a grinding aid.

19. The coated abrasive sheet material of claim 18 wherein said grinding aid is $KBF_4$.

20. A method of making ceramic abrasive grits, said method comprising the steps of:
   (a) selecting a mixture from the group consisting of (1) a mixture consisting of alumina hydrate, the oxide of a rare earth metal selected from the group consisting of praseodymium, samarium, ytterbium, neodymium, lanthanum, gadolinium, cerium, dysprosium, erbium and mixtures of two or more of such rare earth metals and optionally yttria or the precursor of said oxide or yttria if used in a liquid vehicle to produce a blend in an amount to provide up to 30% by weight yttria, at least about 0.5% by weight rare earth metal oxide, and alpha alumina making up the balance of 100% by weight after firing the solids of said blend, and (2) a mixture comprising alumina hydrate, the oxide of a rare earth metal selected from the group consisting of praseodymium, ytterbium, neodymium, lanthanum, gadolinium, dysprosium, erbium and mixtures of two or more of such rare earth metals, and optionally yttria or the precursor of said oxide or yttria if used on a liquid vehicle to produce a blend in an amount to provide up to 30% by weight yttria, at least about 0.5% by weight rare earth metal oxide and alpha alumina making the balance of 100% by weight, after firing the solids of said blend;
   (b) drying the blend to produce a dried solid;
   (c) crushing the dried solid to produce particles;
   (d) calcining the dried particles to substantially remove bound volatile materials; and
   (e) firing the particles to produce a ceramic material.

21. The method of claim 20 wherein said precursor compound of said rare earth metal is a rare earth metal salt of a volatile anion.

22. The method of claim 20 wherein said combining is by way of a sol gel method comprising first preparing a mixture of an aqueous dispersion of alumina hydrate and an oxide of said rare earth metal or a precursor thereof and then gelling said mixture to produce said blend of the gelled material.

23. The method of claim 22 further including the step of shaping the gelled material.

24. The method of claim 23 wherein the shaping is by extrusion.

25. The method of claim 20 further including the step of adding a nucleating agent to the aqueous dispersion.

26. The method of claim 20 wherein said combining is by way of an impregnation method comprising preparing a sol of alumina hydrate, drying the sol to form a porous dried solid comprised of dried sol, crushing the porous dried solid to form particles, calcining the particles to convert the alumina hydrate to an insoluble form of alumina, preparing a homogeneous mixture of said rare earth metal oxide or its precursor in a liquid vehicle in which the calcined alumina is substantially insoluble, and impregnating said mixture into said particles.

27. The method of claim 26 wherein said impregnation is accomplished by impregnating said particles more than one time.

28. The method of claim 27 wherein the concentration of rare earth metal oxide or its precursors in the impregnation solution is the same in each impregnation.

29. The method of claim 27 wherein the concentration of impregnation solution is different for each impregnation.

30. The method of claim 27 wherein the composition of the impregnating solution is the same for each impregnation.

31. The method of claim 27 wherein the composition of the impregnating solution is different for each impregnation.

32. The method of claim 20 wherein said alumina hydrate is boehmite.

33. The ceramic abrasive grits of claim 1 also including a modifying additive.

34. The ceramic abrasive grits of claim 33 wherein said modifying additive is an oxide of a metal selected from the group consisting of magnesium, zinc, cobalt, nickel, zirconium, hafnium, and mixtures thereof.

35. The ceramic abrasive grits of claim 33 wherein said modifying additive forms a spinel crystal structure with alumina.

36. The ceramic abrasive grits of claim 35 wherein said spinel crystal structure comprises magnesia-alumina.

37. An abrasive article comprising the ceramic abrasive grits of claim 33.

38. The method of claim 20 further including the step of adding a precursor of a modifying additive to the aqueous dispersion.

39. The method of claim 38 wherein said precursor comprises $Mg(NO_3)_2 \cdot 6H_2O$.

40. The ceramic abrasive grits of claim 1 wherein aluminum oxide and said rare earth metal oxide reaction product is beta alumina.

41. The ceramic abrasive grits of claim 1 wherein at least a portion of said reaction product is in the form of hexagonal rare earth aluminate.

42. The abrasive product of claim 9 wherein at least a portion of said reaction product is in the form of a hexagonal rare earth aluminate.

43. The coated abrasive product of claim 13 wherein at least a portion of said reaction product is in the form of hexagonal rare earth aluminate.

44. The method of claim 25 including the step of adding a divalent metal ion and wherein the nucleating agent is an alpha iron oxide precursor.

45. The method of claim 44 wherein said alpha iron oxide precursor has a surface area of at least about 5 $m^2/g$.

46. The method of claim 45 wherein said surface area is in the range of 50-200 $m^2/g$.

* * * * *

UNITED STATES PATENT AND TRADEMARK OFFICE
CERTIFICATE OF CORRECTION

PATENT NO. : 4,881,951

DATED : NOV. 21, 1989

INVENTOR(S) : WILLIAM P. WOOD ET AL.

It is certified that error appears in the above-identified patent and that said Letters Patent is hereby corrected as shown below:

Col. 5, line 32, "$5m_2/g$," should be --$5\ m^2/g$,--.

Col. 7, line 55, "4,734,104" should be --4,744,802,--.

Col. 11, line 28, "incluned" should be --inclined--.

Col. 16, line 13, "140cm:" should be --$140cm^2$.--.

Col. 18, line 45, "Disperal$^{198}$" should be --Disperal$^{TM}$--.

Col. 18, line 60, "66" should be --66cm--.

Col. 19, line 40, "$Pr_2P_3$" should be --$Pr_2O_3$--.

Col. 20, line 34, "compares" should be --compare--.

Col. 21, lines 9-10, "The calciner had a" should be --The calciner had a hot zone feed end temperature of 350°C and an--.

Col. 21, line 11, "feed" should be --fed--.

Col. 21, line 46, "as" should be --has--.

UNITED STATES PATENT AND TRADEMARK OFFICE
CERTIFICATE OF CORRECTION

PATENT NO. : 4,881,951

DATED : NOV. 21, 1989

INVENTOR(S) : WILLIAM P. WOOD ET AL.

It is certified that error appears in the above-identified patent and that said Letters Patent is hereby corrected as shown below:

Col. 23, line 33, "on" should be --in--.

Col. 23, line 57, "the aqueous dispersion" should be --said mixture--.

Col. 23, line 58, "combining is" should be --mixture is obtained--.

Signed and Sealed this

Eighteenth Day of September, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,881,951
DATED : November 21, 1989
INVENTOR(S) : William P. Wood, et al.

It is certified that error appears in the above-identified patent and that said Letters Patent is hereby corrected as shown below:

Col. 22, line 56, "meals" should be --metals--.

Col. 22, line 57, "100%" should be --100% by weight--.

Col. 23, line 22, "optionally yttria or the precursor" should be --optionally yttria, or the precursor--.

Col. 23, line 23, "if used in a liquid" should be --if used, in a liquid--.

Col. 23, line 32, "optionally yttria or the precursor" should be --optionally yttria, or the precursor--.

Col. 23, line 33, "if used on a liquid" should be --if used, in a liquid--.

Col. 23, line 42, "firing the particles" should be --firing said calcined particles--.

Col. 23, line 44, "compound of said rare earth" should be --of said rare earth--.

UNITED STATES PATENT AND TRADEMARK OFFICE
CERTIFICATE OF CORRECTION

PATENT NO. : 4,881,951

DATED : November 21, 1989

INVENTOR(S) : William P. Wood, et al.

It is certified that error appears in the above-identified patent and that said Letters Patent is hereby corrected as shown below:

Col. 24, line 7, "said particles" should be --said calcined particles--.

Col. 24, lines 38-39, "to the aqueous dispersion" should be --to said mixture--.

Signed and Sealed this

Twenty-fifth Day of February, 1992

Attest:

HARRY F. MANBECK, JR.

*Attesting Officer*     *Commissioner of Patents and Trademarks*